(12) United States Patent
Coole

(10) Patent No.: US 11,095,760 B1
(45) Date of Patent: Aug. 17, 2021

(54) IMPLEMENTING CONFIGURABLE PACKET PARSERS FOR FIELD-PROGRAMMABLE GATE ARRAYS USING HARDENED RESOURCES

(71) Applicant: Cisco Technology, Inc., San Jose, CA (US)

(72) Inventor: James Coole, Morrisville, NC (US)

(73) Assignee: Cisco Technology, Inc., San Jose, CA (US)

(*) Notice: Subject to any disclaimer, the term of this patent is extended or adjusted under 35 U.S.C. 154(b) by 66 days.

(21) Appl. No.: 16/742,651

(22) Filed: Jan. 14, 2020

(51) Int. Cl.
*H04L 29/06* (2006.01)
*H04L 12/741* (2013.01)

(52) U.S. Cl.
CPC ............ *H04L 69/22* (2013.01); *H04L 45/745* (2013.01)

(58) Field of Classification Search
CPC .............................. H04L 69/22; H04L 45/745
See application file for complete search history.

(56) References Cited

U.S. PATENT DOCUMENTS

| | | | |
|---|---|---|---|
| 10,412,018 B1* | 9/2019 | Feng | H04L 47/50 |
| 2005/0174270 A1* | 8/2005 | Koo | H03M 7/42 |
| | | | 341/67 |
| 2017/0195259 A1* | 7/2017 | Florea | H04L 69/22 |

\* cited by examiner

*Primary Examiner* — Kevin M Cunningham
(74) *Attorney, Agent, or Firm* — Lee & Hayes, P.C.

(57) ABSTRACT

Techniques for improving the ability of FPGAs to process packets by implementing at least portions of the logic of packet parsers traditionally performed using the FPGA fabric as hardened resources, such as an Integrated Circuit (IC) block. The IC block receives bits of an incoming packet, carries these bits as a pipeline, and modifies a range of the bits through stages of aligners. The aligners extract header sections (or "windows") of each packet header according to a shift amount, and the header sections are output to the FPGA fabric. The FPGA fabric includes extract and decision logic that maps the information included in the extracted header sections to a lookup vector, driving tables, and/or application logic. The FPGA provides shift amounts to subsequent aligners to cause the aligners to shift the packet bus such that previous header sections are removed.

20 Claims, 7 Drawing Sheets

IMPLEMENTING CONFIGURABLE PACKET PARSERS FOR FIELD-PROGRAMMABLE GATE ARRAYS USING HARDENED RESOURCES

TECHNICAL FIELD

The present disclosure relates generally to improving the ability of field-programmable gate arrays (FPGAs) to process packets using packet parsers.

BACKGROUND

Network devices generally include network interface controllers (NICs) to connect to networks of other network devices. These network devices utilize NICs to communicate with each other via communication streams that include packets having packet headers defined according to various protocols that indicate how the packets are to be processed. Network devices that receive packets in a communication stream from other network devices may examine fields of the packet headers to decide what to do with each packet. For example, a network device may examine an Internet Protocol (IP) destination address in a packet header to decide where to send the packet next, a firewall may compare several fields of a packet header against an access-control list (ACL) to decide whether to drop a packet, and so forth.

The process of identifying and extracting the appropriate fields in a packet header is often referred to as "parsing," and NICs of network devices may be used for offloading and implementing packet-processing pipelines to parse the packet header of a packet. Increasingly, the packet-processing techniques performed by NICs have been implemented using FPGAs, which can provide performance and latency advantages over other architectures, while also enabling inline application offloads. However, non-trivial packet-processing pipelines are challenging to implement efficiently on the FPGA's fabric of reconfigurable logic primitives. In particular, packet parsers are typically dominated by steering logic which benefits little from hardened blocks in FPGA architectures, and may also map inefficiently to lookup tables (LUTs) and/or multiplexers (MUXs). The mapping to LUTs or MUXs may require high resource utilization, as well as fragmentation of logic across the FPGA fabric, which results in extensive use of routing resources that increases power consumption, decreases clock frequency ($f_{max}$), and requires deep pipelining to achieve throughput targets.

Accordingly, non-trivial packet parsers may see low quality of results (QoR) when implemented on FPGAs, thereby limiting the applicability or effectiveness of these FPGA-based devices or requiring complex board-level integration with traditional NICs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
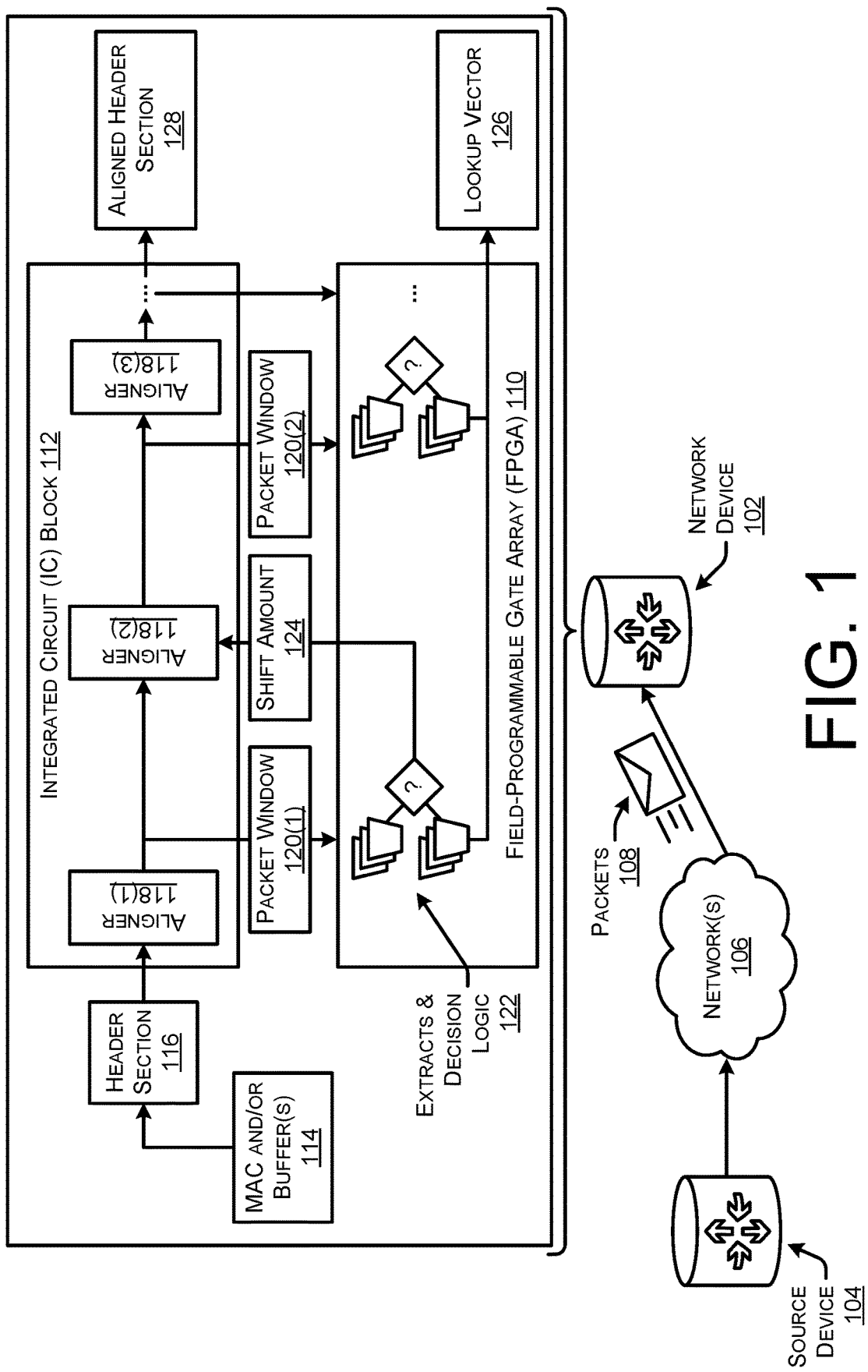
FIG. 1 illustrates a system-architecture diagram of an example network device that receives at least one packet from a source device, and parses header sections of the packet using at least an IC block and FPGA. The IC block is a hardened resource that is used to perform portions of a packet parser that traditionally would be virtualized using the FPGA fabric.

This disclosure describes techniques for implementing at least a portion of the logic of packet parsers on FPGAs using hardened resources to improve the utilization of FPGAs' fabric resources. According to the techniques described herein, a network device may be configured to receive a packet flow over a network from a source device, and the network device may include an integrated circuit (IC) configured to accept a first range of bits corresponding to a header section of a packet in the packet flow. An FPGA may receive, from the IC, a first portion of the first range of bits, and identify one or more first headers of the packet represented in the first portion of the first range of bits. The FPGA may output a first shift amount to a first barrel shifter of the IC, and the first barrel shifter may remove the first portion from the first range of bits to result in a second range of bits.

Even further, the FPGA may receive a second portion of the second range of bits from the IC, and identify one or more second headers of the packet represented in the second portion. The FPGA may output a second shift amount to a second barrel shifter of the IC, and the second barrel may remove the second portion from the second range of bits based on the second shift amount to result in a third range of bits.

Additionally, the techniques described herein may be performed as a method and/or by a system having non-transitory computer-readable media storing computer-executable instructions that, when executed by one or more processors, performs the techniques described above.

Example Embodiments

Network devices connect to other network devices in networks using NICs that are configured to implement various communication protocol stacks. For example, the NIC in a network device includes and utilizes electronic circuitry required to communicate using physical layer and data link layer standards, which provide a base for a full network protocol stack. For instance, the network devices may be able to communicate using their NICs using routable protocols, such as Internet Protocol (IPv4, IPV6, etc.). The NICs are uniquely assigned respective media access layer (MAC) addresses to enable these communications between network devices using the various network technologies. Generally, the communication of information between network devices includes a flow of packets represented by a range of bits, and the packets include headers that define control information for delivering the payload of the packets to a destination network address.

Accordingly, network devices must parse packet headers to determine how the packets should be processed according to the control information contained in fields of the headers. Although there is a variety of types of network devices (e.g., routers, switches, wireless access points, gateways, modems, hubs, etc.), every network device examines the fields in the packets headers to decide what to do with each packet. For example, a network device may examine an Internet Protocol (IP) destination address in a packet header to decide where to send the packet next, a firewall may compare several fields of a packet header against an access-control list (ACL) to decide whether to drop a packet, and so forth.

Network devices include NICs that are used to implement packet parsers that parse the appropriate fields in a packet header to determine how the packet should be processed. Increasingly, the packet parsers are implemented using FPGA-based NICs, which offer good performance and reconfigurable logic blocks. However, the packet-processing pipelines may be inefficiently implemented using the FPGA fabric. For instance, packet parsers may be dominated by steering logic that may benefit little from hardened blocks in FPGA architectures, and may also map inefficiently to lookup tables (LUTs) and/or multiplexers (MUXs). The mapping to LUTs or MUXs may require high resource utilization, as well as fragmentation of logic across the FPGA fabric, which results in extensive use of routing resources that increases power consumption, decreases clock frequency (film), and requires deep pipelining to achieve throughput targets. Accordingly, non-trivial packet parsers may see low quality of results (QoR) when implemented on FPGAs, thereby limiting the applicability or effectiveness of these FPGA-based devices or requiring complex board-level integration with traditional NICs.

This disclosure describes techniques for improving the ability of FPGAs to process packets by implementing at least a portion of the logic of packet parsers traditionally performed using the FPGA fabric itself, via hardened resources, such as an Integrated Circuit (IC) block (e.g., ASIC). Rather than virtualizing logic for implementing packet-processing pipelines, which may utilize extensive amounts of the FPGA resources, a portion of the traditionally virtualized logic may be implemented using a hardened IC block. The IC block may implement portions of a packet parser, such as receiving input including a range of bits from an incoming packet, carrying these bits as a pipeline, and modifying the range of bits through several stages of "aligners," which may be implemented as full-width limited-range barrel shifters.

The aligners of the IC block may expose sections (or "windows") of the bus they output to the FPGA. The FPGA fabric may include extract and decision logic that receives the window and identifies and extracts the headers therein, typically using these extracted headers to form, for example, lookup vectors to drive tables or application logic downstream. Based on the headers this FPGA logic identifies and extracts, the FPGA may then provide shift amounts to subsequent aligners in order to cause the aligners to shift the packet bus such that the headers it identified are removed, minimizing the complexity of FPGA extract logic subsequent to the driven aligner by reducing the packet offsets it needs to be able to handle. For example, header extracts (implemented in the FPGA) immediately following this aligner will always use data at the start of the aligner's output since previous headers have been removed.

The utilization of the IC block as described herein may implement logic of a packet parser that otherwise would be virtualized by the FPGA, thereby reducing the use of the FPGA's fabric resources, and improving quality of results of the complete mapping for a packet header. In some examples, the IC block may be a hardened block that is incorporated into the FPGA fabric, and in other examples, the IC block may be incorporated alongside embedded FPGAs (eFPGAs). The techniques described herein are generally applicable for any type of computing device that parses packet headers to determine how to process a packet. Additionally, the techniques are equally applicable to any type of communication protocol and packet structure. For instance, the aligners may include barrel shifters that are reconfigurable to extract header sections of various lengths based on the shift amount received from the FPGA.

According to the techniques described herein, the FPGA provides shift amounts to subsequent aligners to cause the aligners to shift the packet bus such that previous header sections are removed, which has the effect of minimizing the complexity of header extracts in subsequent parse states. By scheduling complex parse graphs across this hybrid architecture—deciding which and how many layers of the parse graph should be implemented between aligners so as to minimize offsets throughout the graph, and therefore the complexity of the corresponding extract logic—area, latency, and power can be significantly reduced over existing approaches. While this approach to parser design for FPGAs is particularly useful when the aligner logic is hardened, the approach has benefits over state-of-the-art approaches even when the aligners are implemented using virtual resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 including a network device that receives at least one packet from a source device, and parses header sections of the packet using at least an IC block and FPGA. The IC block is a hardened resource (e.g., hardware component) that is used to perform portions of a packet parser that traditionally would be virtualized using the FPGA fabric.

As shown in FIG. 1, a network device 102 may communicate with a source device 104 over one or more networks 106. The network device 102 and source device 104 may generally comprise any type of network computing device, such as servers, switches, routers, hubs, bridges, gateways, modems, repeaters, access points, and other type of network device. In some examples, the source device 104 and/or network device 102 may comprise various user devices, such as cell phones, tables, laptops, wearable devices, and/or any other type of user device. The network(s) 106 may facilitate communications of information or data between the network device 102 and source device 104, such as a packet 108. The network(s) 106 may include one or more networks implemented by any viable communication technology, such as wired and/or wireless modalities and/or technologies. The networks 106 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networks 106 may include devices, virtual resources, or other nodes that relay packets from one network device to another by nodes in the computer network. The networks 106 may include multiple devices that utilize the network layer (and/or session layer, transport layer, etc.) in the OSI model for packet forwarding, and/or other layers.

Generally, the source device 104 and network device 102 may communicate information over the network 106 using packets 108 which carry the information according to communication protocols defined for the network 106. The packets 108 may consist of control information and a payload. The control information of the packets 108 may include source and destination network addresses, error detection codes, and sequencing information. The control information is generally found in the packet headers and trailers. As an example of a packet 108, for a TCP/IP communication over Ethernet, a TCP segment may be carried in one or more IP packets 108, which are each carried in one or more Ethernet frames.

The network device 102 may receive one or more packets 108 in a communication stream from the source device 104 and/or one or more intermediary hops in the network 106. The network device 102 may comprises a destination device for the packets 108, or an intermediary device that is to forward the packets 108 on to another device. The network device 102 may parse the packet headers of the packets 108 to determine how the packets 108 should be processed according to the control information contained in the fields of the headers of the packets 108.

The network device 102 may include various hardware and/or software components configured to parse packets. For example, the network device 102 may include a field-programmable gate array (FPGA) 110 that communicates or otherwise interfaces with an integrated circuit (IC) block 112 that implements packet-processing pipeline for the packets 108. Further, the network device 102 may include at least one of a MAC and/or buffer 114 to receive the packets 108 and buffer a range of bits that represent the packets 108. The MAC and/or buffer(s) 114 may pass at least the range of bits representing the header section 116 of a packet 108. The IC circuit block 112 may receive the range of bits representing the header section 116 of the packet(s) 108 to parse the packet headers.

Generally, the IC block 112 may comprise one or more integrated circuits configured to parse header sections 116 of packets 108, such as application-specific integrated circuits (ASICs). The IC block 112 may comprise a hardware block that hardens portions of the packet-processing pipeline that traditionally would be virtualized on the FPGA 110 fabric. The IC block 112 may accept, as input, a range of bits form the incoming packet 108, carry the bus as a pipeline, and modify the range of bits through one or more stages of aligners 118(1)-118(3) (or any number 1 or greater). The aligners 118 may comprise, as an example, full-width limited-range barrel shifters configured to shift the range of bits by a varying and reconfigurable amount. In some instances, the barrel shifters that make up the aligners 118 may be implemented using a sequence of shift multiplexers that shift the range of bits. The barrel shifters of the aligners 118 may comprise any type of device or circuit configured to shift input bits according to a shift amount. The IC block 112 may have a configurable width and number of aligners 118 based on architectural parameters determined for the network device 102.

The IC block 112 may receive a range of bits representing the header section 116 of the packet 108 and modify the range of bits as it moves through the stages of aligners 118. The aligners 118 may each be configured to provide a packet window 120 from the range of bits and output the packet window 120 to the FPGA 110. The packet window 120 may comprise a subsection of the full width of the packet bus after it has been shifted. As an example, if an IC block 112 may be byte aligned, for a header bus that is 2048 bits wide, and 4 aligners 118 are provided by the IC block 112, a size of the packet windows 120 may be 512 bits. In such an example, each aligner 118 may support a shift amount in [8, 512], with 0 being supported for free, and thus requiring a 6-stage barrel shifter with per-state shift increments scaled by 8 bits.

In some examples, the FPGA 110 may pull-off the packet windows 120 from the packet bus of the IC block 112 in intervals between aligners 118. The aligners 118 may not necessarily be involved in producing the packet windows 120, but may instead shift the entire bus by the shift amount 124 required to discard any data handled by the prior FPGA 110 logic. Generally, the packet windows 120 may be exposed to the FPGA 110 based on the amount of work the FPGA 110 can perform without the assistance of the next aligner 118 (or shifter), due to the growth in the complexity of the FPGA 110 extract MUXs across control flow joins. The size of the packet window(s) 120 may be related to the maximum shift amount 124 of the next aligner 118. For instance, if each packet window 120 is 50B, the FPGA 110 logic prior to a given aligner 118 could have only handled at most 50B of data. So, the aligner 118 in this example would only need to be able to discard at most 50B of data, and need to support a maximum shift amount 124 of 50B. However, because the window size is fixed, the value for the window size may be selectively chosen for whatever pipeline the network device 102 might be implementing using the FPGA 110, and the values may be configurable or different for different packet-processing pipelines.

Generally, each aligner 118 may shift-in do-not-care values, or a constant value, etc., and discards data shifted out of the range of bits in the input bus such that the bus width remains constant across the aligners 118. Sections of the packet bus between the aligners 118 are either pipelined to a static depth, are implemented as a wide adjustable-depth delay line, and/or as a first-in, first-out (FIFO) buffer. Generally, each aligner 118 may receive a shift amount 124 from the FPGA 110 indicating how much of the range of bits in the bus are to be discarded and shifted from the range of bits after which a packet window of the resulting bus 120 is provided to the FPGA 110. In this way, the FPGA 110 may use extracts and decision logic 122 to analyze the packet windows 120 and determine next shift amounts 124 for subsequent aligners 118. The aligners 118 may be reconfigurable such that they are capable of extracting and outputting packet windows 120 of different sizes, within an upper bound and lower bound of the aligner 118.

Accordingly, parsers are implemented by mapping across the IC block 112 and the FPGA 110 fabric itself. The FPGA 110 may comprise any type of semiconductor device that includes a matrix or arrangement of configurable logic blocks (CLBs) connected via programmable interconnects. The FPGA 110 may be reprogrammed to desired application functionality requirements after manufacturing, which enables the implementation of the decision logic 122 via the fabric of the FPGA 110. In a simple example, the IC block 112 and FPGA 110 may together parse a single bus-width header section 116 of each packet 108, handling one packet 108 as frequently as every cycle, in a fully-pipelined implementation.

As a specific example, header and field extracts may be implemented in the FPGA 110 as element-width MUXs, selecting between offsets from one of the packet windows 120 output by the IC block 112. The range of offsets for one of the extracts may be limited to the set of possible offsets after the packet has been aligned by the preceding aligner 118 (if any) to remove any data previously extracted. The decision logic 122 that implements parser state transitions may use data produced by these extracts to determine next states and to keep an accounting of the current offset (and remaining packet length) for downstream extracts. In most examples, multiple extracts, executing speculatively, may exist in the intervals between alignment states, with the tail position of the last extract executed in a given interval determining the next aligner's 118 shift amount. This design and technique may have the effect of "resetting" the range of offsets for states scheduled following an aligner 118, which may prevent the combinatorial explosion that otherwise occurs across parse state joins—and therefore reducing the size and logic depth of the extract and decision logic 122.

In a specific example, the aligner 118(1) may pass a packet window 120(1) to the extracts and decision logic 122 that includes one or more fields of the header section 116 of a packet 108. The extracts and decision logic 122 may extract, from the packet window 120(1), the Ethernet frame and store the extract and/or populate a lookup vector 126 which is propagated down. The extracts and decision logic 122 may then look at fields of the header section 116 represented in the packet window 120(1) to determine what state to move into next in a parse graph, such as by using the lookup vector 126 and a lookup table (LUT). The extracts and decision logic 122 may return a shift amount 124 to the aligner 118(2) indicating how much of the packet bus to remove.

The aligner 118(2) may receive the shift amount 124, remove the bits from the packet bus that were analyzed by the extracts and decision logic 122 by shifting the packet bus by the shift amount 124. The aligner 118(2) may then extract and output another packet window 120(2) to the extracts and decision logic 122. The extracts and decision logic 122 may analyze the packet window 120(2) and determine that the extract includes, for example, one of an IPv4 or IPv6 header extract. The IPv4 or IPv6 header extract may then populate the lookup vector which is used to determine further states. For example, the extracts and decision logic 122 may determine that a next header we are going to hit is UDP, but the UDP header will be at a different offset based on either the IPv4 or IPv6 header extract existing. If the parser is mapped to the architecture such that the UDP header is guaranteed to fall inside this packet window, the UDP header may be extracted and used to determine which of potentially many possible extracts, determined by the parse graph being implemented, will execute on the data at the tail of the UDP header. This process can continue until the current packet window is exhausted and the last extract possible for this window executes. The position of the tail of this last extract determines the shift amount 124 fed to the next aligner 118(3), and the process may continue until the header section 116 of the packet 108 is parsed by the IC block 112 and FPGA 110. Each aligner 18 may continue to output an aligned header section 128 for the next aligner 118 in the IC block 112 to extract packet windows 120 from based on an indicated shift amount 124. The extracts and decision logic 122 may continue to populate the lookup vector 126 to make decisions for parsing the header section 116, and ultimately to make a decision regarding how the packet 108 is to be handled by the network device 102. As an example, the lookup vector 1126 may be used to determine where the network device 102 is to send the packet 108 next, used by a firewall by comparing several fields of the packet header represented in the lookup vector 126 against an ACL to decide whether to drop the packet 108, for use by downstream applications, and so forth.

Using the techniques described herein, variable-length extracts may also be handled efficiently using the IC block 112 and FPGA 110 architecture. In some examples, the set of offsets for extracts following a variable-length extract can be very large compared to other extracts. For example, extracting a variable-length header ranging from 0b to 1024b in increments of 32b requires all subsequent extracts to be implemented using at least 32-input MUXs. These offsets, like any others, may also grow rapidly across control joins. In the architecture described herein, an alignment stage can be used immediately following a variable-length extract to "shield" subsequent extracts from this complexity as discussed above.

The pipeline depth of the FPGA logic 122 that falls within each interval, dependent on how a particular parse graph is mapped across the fabric and IC block, can either be used to statically set the IC block's 112 pipeline depth, if it's adjustable.

Or, alternately, if the IC block's 112 depth is fixed, that depth can set a pipelining requirement for the FPGA logic 122.

The output of the extract and decision logic 122 mapped to the FPGA 110 is typically a lookup vector 126, driving tables (in P4-style SDN applications) or application logic (for inline acceleration) downstream. The output of the IC block 112 may be any remaining portion of the packet's 108 payload in the one-packet-per-cycle case.

In some examples, the proposed architecture saves significant virtual resources by hardening the wide barrel shifters (e.g., aligners 118) and pipelined packet bus that are otherwise prohibitively expensive to virtualize on traditional FPGA 110 fabric resources. This is due to a large (as much as two orders of magnitude using current technologies) area difference between the FPGA's 110 virtual resources and the IC clock's 112 cells and fixed routing. However, the IC block 112 logic can also clock several times faster than the FPGA 110 fabric. For example, in a 7 nm technology, it may be possible to implement shifters capable of operating above 3 GHz, while FPGA 110 fabrics generally nominally support frequencies around 700 MHz for simple designs, and less for real designs. FPGA 110 packet pipelines can only get beyond the technology's frequency limitations through replication, which without hardened logic is prohibitively expensive for non-trivial packet processors. In the architecture described herein, the IC block 112 can be designed to run at a multiple of the FPGA 110 frequency, allowing it to be used as a time-multiplexed resource. When used in this way, the performance of designs mapped across the FPGA 110 and IC block w112 can be scaled in throughput by replicating only the FPGA 110 portion of the design (up to the ASIC/FPGA clock ratio), with all replicates providing their outputs once per FPGA 110 clock cycle and the IC block 112 doing the work for all replicates per IC block 112 clock cycle.

Although illustrated as separate components, the IC block 112 may be implemented in or included in the fabric of the FPGA 110. For instance, the IC block 112 may be implemented using logic blocks of the FPGA 110 fabric and included in the FPGA 110. However, the IC block 112 is a hardened, hardware-based component as described herein.

Figure 2:
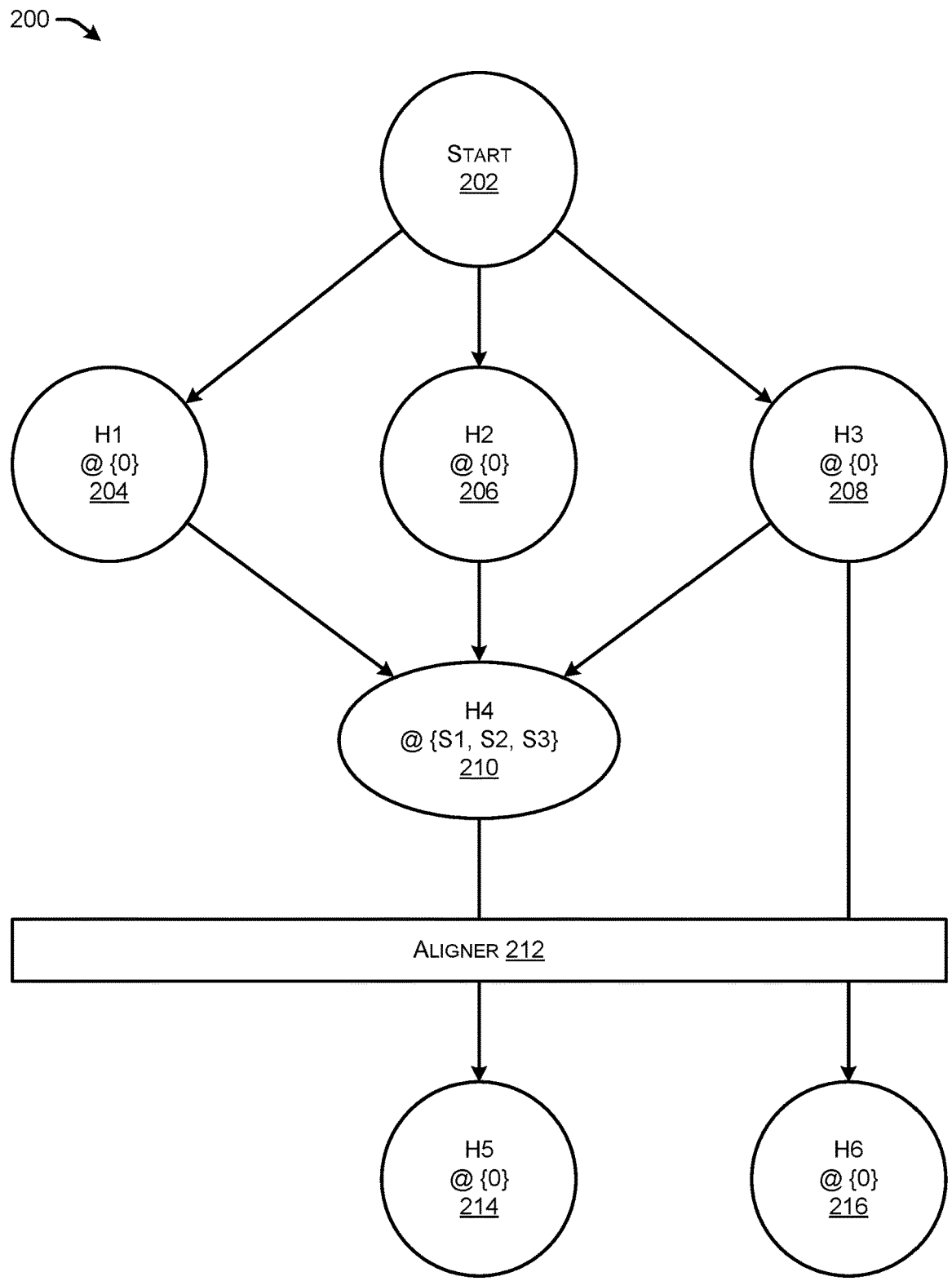
FIG. 2 illustrates an example of a parse graph where the set of possible offsets from the packet bus at which each header extract may occur grows across control flow joins, and a hardened aligner shifts the bus to remove the offsets due to preceding extracts, resetting the offsets for subsequent extracts to reduce this growth.

FIG. 2 illustrates an example of an extremely simple parse graph 200 that demonstrates how the set of possible offsets for each extract grows across control flow joins, and how a hardened aligner shifts to remove the effective offsets from preceding extracts to reset the offsets for subsequent extracts.

Generally, the parse graph 200 depicts the header sequences in the header section 116 seen by the network device 102. The parse graph 200 may be a directed acyclic graph where the vertices represent header types and edges specify the sequential ordering of headers. The parse graph 200 may be a state machine that sequentially identifies the header sequence in the header section 116 of the packet 108. For instance, starting at the root node, or start 202, state transitions are taken in response to next-header field values. The path that is traced through the parse graph 200 matches the header sequence in the header section 116. The parse graph 200 (and hence state machine) within a parser may be either fixed (hard coded) or programmable. A fixed parse graph 200 may be chosen at design-time and cannot be changed after manufacture, while a programmable parse graph 200 is programmed at run-time.

As shown in FIG. 2, the initial parse state at start 202 will being where one or more headers from the header section 116 is pulled out. In this case, it is known that the start 202 begins at zero such that headers 1, 2, and 3 are all guaranteed to exist, if at all, at offset zero. Thus, as illustrated, the offsets for possible states of H1 204 is zero, for H2 is zero, and for H3 is zero. However, the set of possible offsets for each extract grows across control flow joins. For instance, the extract for header 4 (H4) 210 may come from packet offsets starting after any preceding extract: H1 204, H2 206, or H3 308. Thus, the extract of H4 210 would have an offset starting at the size of a preceding extract, S1, S2, or S3. However, because the parse graph 200 at H4 210 has potential offsets of three different amounts, if the network device 102 would like to process the packet 108 in a pipeline fashion, the FPGA 110 fabric would have to provide a three-input MUX, and if that branches into other states, the growth builds and builds into a very large and complicated pipeline. Note that typical use of this architecture would schedule deeper chains of extracts than illustrated here into intervals between aligners to minimize the cost of implementation for a given parse graph. For example, scheduling topological layers of the parse graph within each interval until the complexity of the next layer of extract logic grows prohibitive, and at this point deciding to use an aligner to stop this growth in complexity by scheduling an aligner, and moving on to the next interval.

Accordingly, an aligner 212 may be placed after H4 210 such that the aligner 212 shifts to remove the effective offset from preceding extracts, thereby "resetting" the offsets for subsequent extracts. For example, after the aligner 212, the extract H5 214 and/or H6 216 can only be found at offset zero in that packet window due to the aligner 212 removing the offset after whichever extract was last to execute on the window preceding that aligner—specifically S1+S4, S2+S4, or S3+S4 (depending on the path taken) if H4 was last to execute, or S3 if H3 was last to execute. In this way, the aligner 212 may be utilized to optimize the implementation of parse graphs like 200 by removing the tail offsets of preceding extracts to reduce the number of possible starting offsets for extracts subsequent to the aligner.

Figure 3:
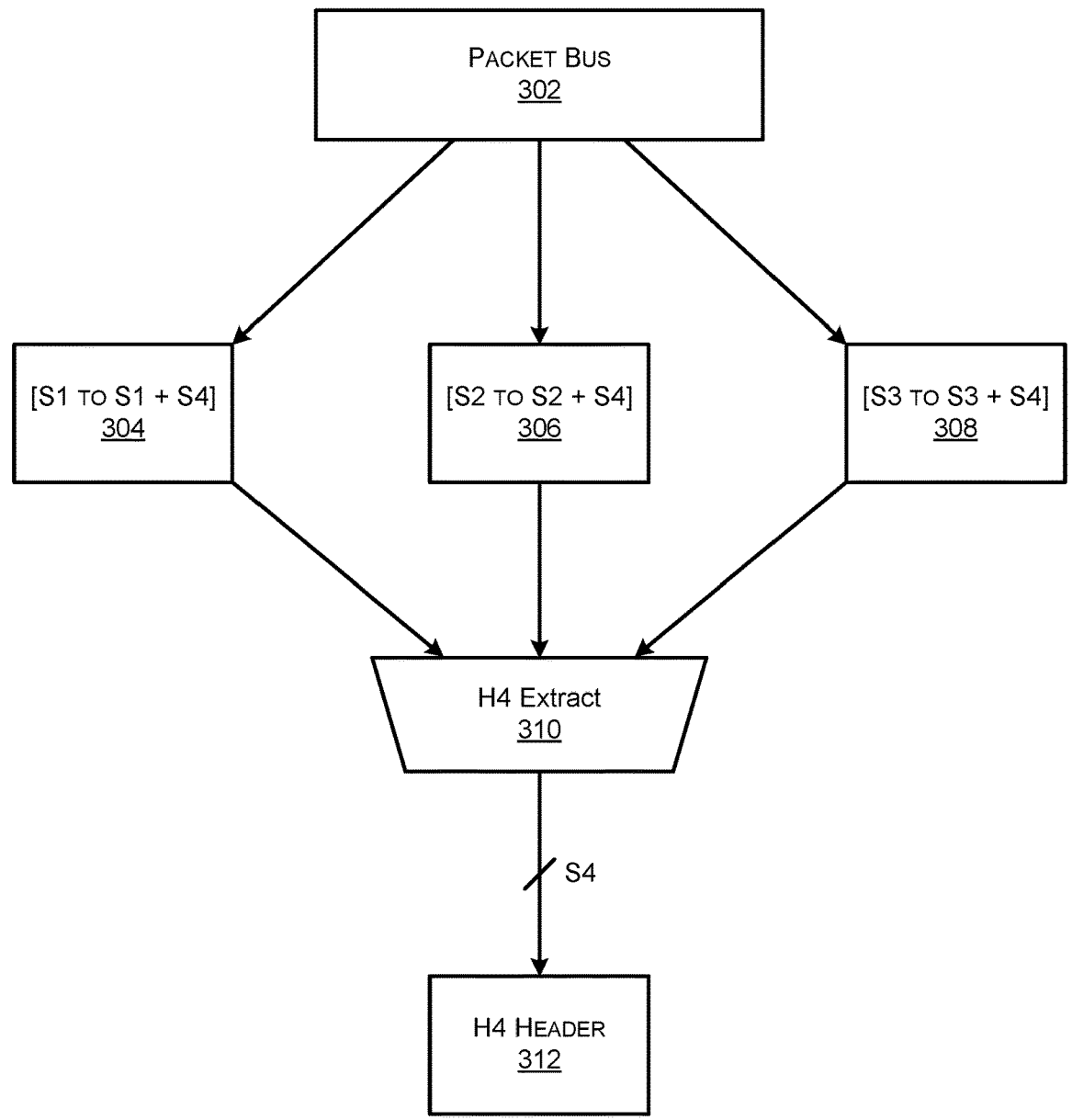
FIG. 3 illustrates an example of possible offsets from a packet bus where an individual extract is implemented as a MUX between slices of the packet bus starting at each of the possible offsets.

FIG. 3 illustrates a typical implementation of extract logic (e.g. for header H4 210 in FIG. 2) as a header-wide (width S4) MUX 310 selecting between slices of the packet bus 302, with one slice for each possible offset where the header H4 210 may be found in the current packet window (e.g. [S1 to S1+S4] when header H4 is found down the path from H1 in FIG. 2). The more offsets an individual extract may pull from, the larger the MUX, and the greater the fabric resources utilized. By scheduling parse graphs to periodically use aligners, like 212 in FIG. 2, the number of offsets that need to be handled for extracts throughout the parse graph can be reduced, minimizing the size and latency of extract logic like the MUX in 310. For example, as H5 and H6 are guaranteed to be found at the start of the window exposed by aligner 212, no MUX is required for their implementation as only a single offset (0) needs to be handled.

Figure 4A:
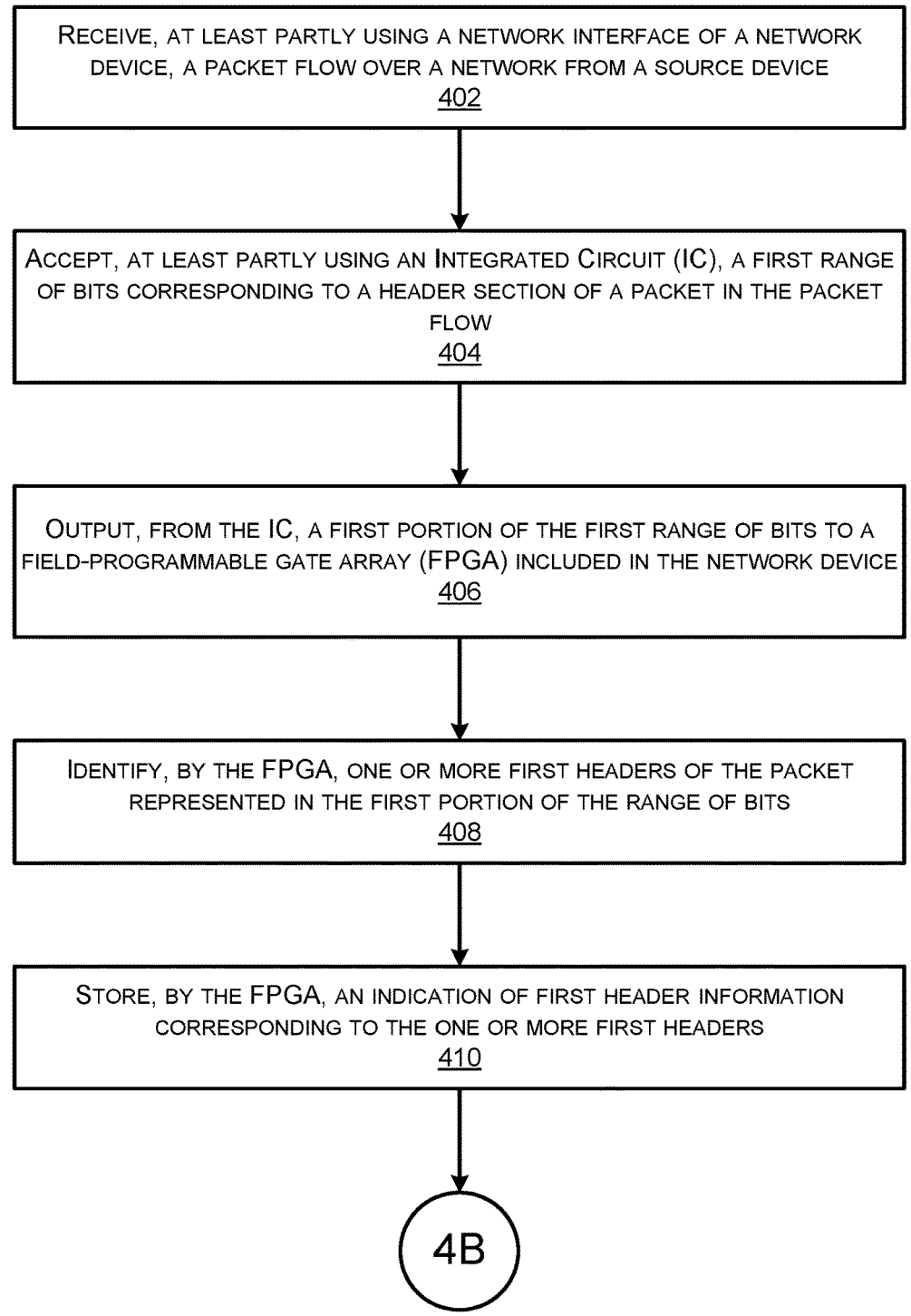
FIGS. 4A, 4B, and 4C collectively illustrate a flow diagram of an example method for implementing at least a portion of the logic of packet parsers of FPGAs using hardened resources to improve the utilization of FPGAs' fabric resources.
Figure 4B:
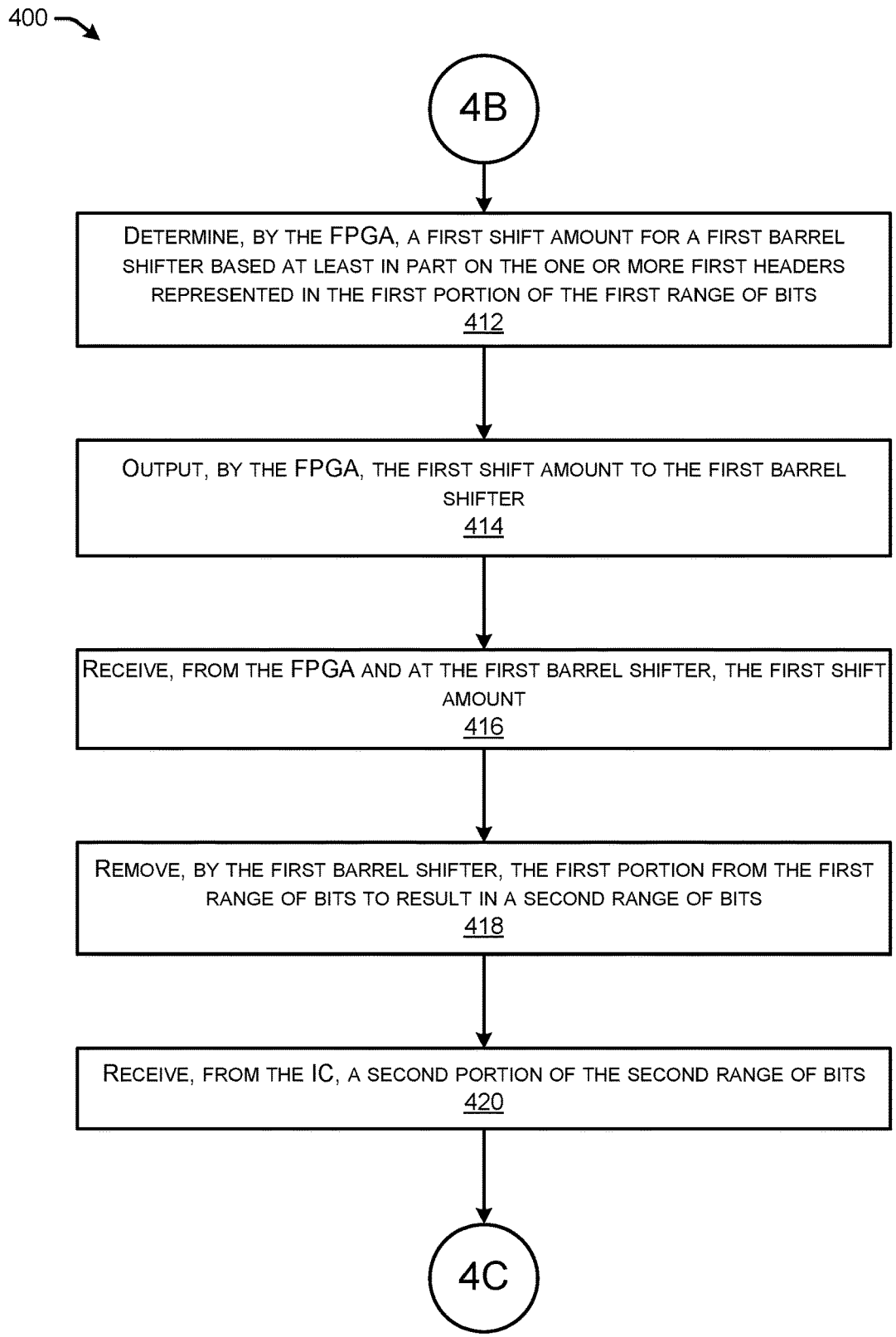
Figure 4C:
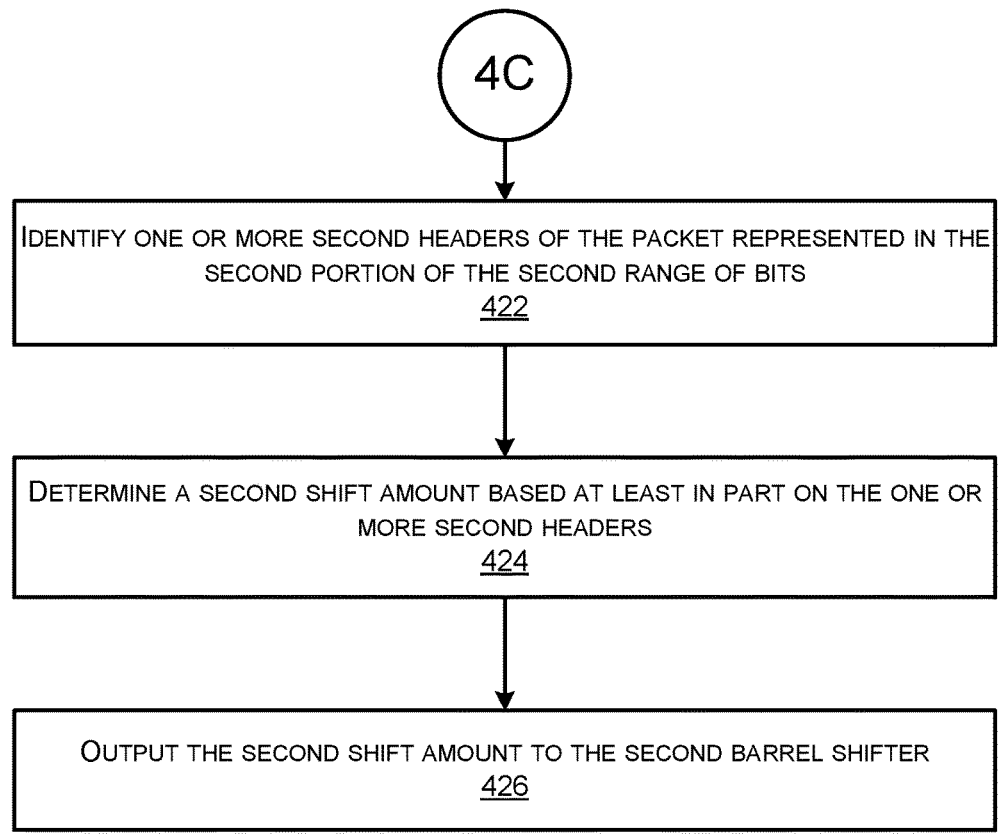

FIGS. 4A, 4B, and 4C collectively illustrate a flow diagram of an example method 400 that illustrate aspects of the functions performed at least partly by the network device 102 as described in FIGS. 1-3. The logical operations described herein with respect to FIGS. 4A, 4B, and 4C may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, and 4C and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A, 4B, and 4C collectively illustrate a flow diagram of an example method 400 for implementing at least a portion of the logic of packet parsers of FPGAs using hardened resources to improve the utilization of FPGAs' fabric resources. In some examples, the steps or operations of method 400 may be performed by a network device 102 and/or a system of components configured to receive a packet flow over a network 106 from a source device 104.

The network device 102 may include an integrated circuit (IC) 112 configured to accept a first range of bits corresponding to a header section 116 of a packet 108 in the packet flow. The IC 112 may include a first barrel shifter (e.g., aligner 118) configured to remove a first portion of the first range of bits based on a shift amount 124 received from a field-programmable gate array (FPGA) 110, wherein the first portion of the first range of bits (e.g., packet window 120) is extracted from the IC block 112 by the FPGA 110. Further, the IC 112 may include at least a second barrel shifter (e.g., aligner 118) configured to receive, from the FPGA 110, an indication of a shift amount 124 from the FPGA 110 indicating a second portion of the second range of bits, and remove the second portion from the second range of bits to result in a third range of bits. Stated otherwise, the barrel shifters, or aligners 118, may be configured to remove the data from the extracts of the previous packet windows 120 to reset the parse graph 200 to zero for the new extract.

At 402, the network device 102 may receive, at least partly using a network interface, a packet flow over a network from a source device. For instance, the network device may have a network interface controller that includes the IC block 112 and FPGA 110, among other components, configured to receive packets 108 over the network 106 from the source device 104.

At 404, the IC 112 of the network device 102 may accept a first range of bits corresponding to a header section 116 of a packet 108 in the packet flow 404. At 406, the IC block 112 may output a first portion of the first range of bits to the FPGA 110 included in the network device 102. In some instances, the FPGA 110 may extract or obtain the first portion of the first range of bits.

At 408, the FPGA 110 may be configured with logic to cause the FPGA 110 to identify one or more first headers of the packet represented in the first portion of the range of bits. For instance, the FPGA 110 may identify at least an Ethernet header of the header section 116 of the packet 108.

At 410, the FPGA 110 may store an indication of first header information corresponding to the one or more first headers of the packet represented in the first portion of the range of bits. For instance, the FPGA 110 may store the Ethernet header information locally, potentially in the lookup vector 126, that was extracted from a packet window 120 of the header section 116.

At 412, the FPGA 110 may determine a first shift amount 124 for the first barrel shifter 118 based at least in part on the one or more first headers represented in the first portion of the first range of bits. For instance, the extracts and decision logic 122 may determine an edge of a header field represented in the packet window 120. The extracts and decision logic 122 may, at 414, output the shift amount 124 to the first barrel shifter (e.g., aligner 118) that indicates the offset for the aligner 118 for a subsequent packet window 120 that is to be provided to the FPGA 110.

At 416, the first barrel shifter 118 of the IC block 112 may receive the first shift amount 124. Generally, the first shift amount may indicate the first portion of the first range of bits that were extracted from the bus by the FPGA 110.

At 418, the first barrel shifter 118 may remove the first portion from the first range of bits to result in a second range of bits. The second range of bits may have an initial bit that was adjacent a last bit of the first portion of the first range of bits that was removed.

At 420, the FPGA 110 may receive or extract, from the IC 112, a second portion of the second range of bits. At 422, the extracts and decision logic 122 of the FPGA 110 may identify one or more second headers of the packet represented in the second portion of the second range of bits.

At 424, the FPGA 110 may determine a second shift amount based at least in part on the one or more second headers. For instance, the FPGA 110 may determine an end of the second shift amount 124 based at least in part on an end of a second header of the one or more second headers in the second portion of the second range of bits. At 426, the FPGA 110 may output the second shift amount 124 to the second barrel shifter 118.

In some examples, the techniques described herein may exploit the speed of hardened versus virtual logic to time-multiplex the aligners to serve multiple instances of the pipeline using them in the virtual logic. As an example, FPGA logic may be limited to roughly ~500-700 MHz, whereas the aligners can easily run at 2-3 GHz in the same process. That means a given aligner can do work for several instances of a given FPGA pipeline by sequencing through all instances' inputs during a single FPGA clock cycle. This may be useful because the throughput of an FPGA-based packet pipeline is ultimately limited by the frequency it can run at. To get around these limitations, designers may replicate a pipeline to handle multiple packet streams in parallel. When the aligners are hardened, if they're integrated into the fabric in a way that can be time-multiplexed, they don't need to be replicated as often as the FPGA logic itself (based on the ratio of ASIC/FPGA clock speed). Since fewer resources are needed to implement multiple pipelines, this can enable substantially higher-throughput designs than could be achieved w/o the hardened blocks.

In some examples, the second barrel shifter (e.g., aligner 118) may be configured to remove up to an upper range of bits from the second range of bits and down to a lower range of bits from the range of bits (e.g., upper and lower limits), and the shift amount 124 is determined based at least in part on the shift amount 124 being within the upper range of bits and the lower range of bits.

In some instances, the one or more headers of the packet 108 includes an ethernet header of the packet 108, and the FPGA 110 is configured with further logic 122 to cause the FPGA 110 to populate a lookup vector 126 with data corresponding the ethernet header, and utilize at least the lookup vector 126 for subsequent logic.

In various examples, the FPGA 110 may utilize a greedy algorithm to determine the scheduling of aligners in the parse graph. For example, in an example where the number of aligners 118 is unconstrained for a pure ASIC or FPGA implementation, the FPGA 110 may schedule a layer of a topological sort of the parse graph at a time. For each layer, the FPGA 110 may compute the cost of all the MUXs required to implement extracts in this layer and lower layers, both with and without introducing an aligner 118 before the current layer. The FPGA 110 may compute the cost of the aligner 118 needed to handle all the possible offsets coming into this layer. If the cost of the aligner 118 is lower than the savings for the extracts, then an aligner 118 is inserted. Then continuing to the next layer, and so forth, until all aligners 118 have been determined.

In some instances, the logic 122 of the FPGA 110 may comprise a parse graph 200 defining one or more header sequences recognizable by the network device 102. The FPGA 110 may be configured with further logic 122 to cause the FPGA 110 to identify a layer in the parse graph 200 associated with a header sequence defined by at least a portion of the one or more headers of the packet 108, and reset offsets for nodes in the parse graph 200 that are subsequent the layer associated with the header sequence.

The FPGA 400 may further include logic 122 to cause the FPGA 110 to receive, from the second barrel shifter, the second portion of the range of bits, identify one or more second headers of the packet represented in the second portion of the range of bits, and store a second indication of second header information corresponding to the one or more second headers of the packet. In such examples, the one or more second headers of the packet include at least one of an Internet Protocol version 4 (IPv4) header of the packet, an IPv6 header of the packet, a Transmission Control Protocol (TCP) header of the packet, or a User Diagram Protocol (UDP) header of the packet.

Figure 5:
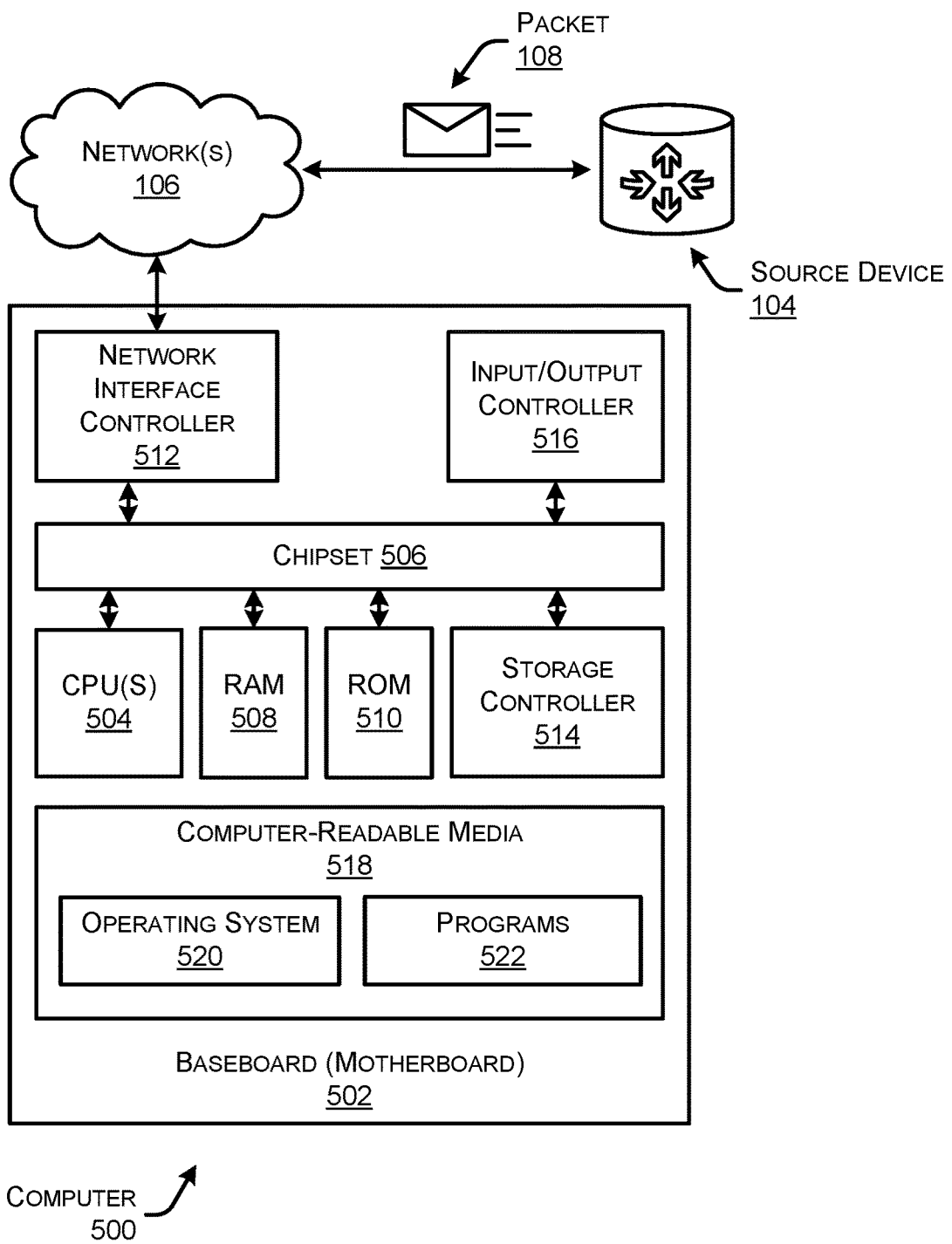
FIG. 5 is a computer architecture diagram showing an illustrative computer hardware architecture for implementing a network device that can be utilized to implement aspects of the various technologies presented herein.

FIG. 5 is a computer architecture diagram showing an illustrative computer hardware architecture for implementing a network device that can be utilized to implement aspects of the various technologies presented herein. The computer architecture shown in FIG. 5 illustrates a conventional server computer, network device 102, workstation, desktop computer, laptop, tablet, network appliance, e-reader, smartphone, or other computing device, and can be utilized to execute any of the software components presented herein. The computer 500 may, in some examples, correspond to a network device 102 described herein, and may comprise networked devices such as servers, switches, routers, hubs, bridges, gateways, modems, repeaters, access points, etc.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 106. The chipset 506 can include functionality for providing network connectivity through a NIC 512, such as a gigabit Ethernet adapter. The NIC 512 is capable of connecting the computer 500 to other computing devices over the network 106. It should be appreciated that multiple NICs 512 can be present in the computer 500, connecting the computer to other types of networks and remote computer systems.

In some examples, the NIC 512 may be configured to perform at least some of the techniques described herein, and may include the FPGA 110, IC block 112, and/or other components for performing the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the network 106 and or any components included therein, may be supported by one or more devices similar to computer 500. Stated otherwise, some or all of the operations performed by the network 106, and or any components included therein, may be performed by one or more computer devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a source device 104 or a network device 102. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the source device 106 and network device 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for determining connectivity in multi-hop paths using BFD Echo packet(s). The programs 522 may enable the network device 102 to perform various operations. Some of the operations described herein are performed by the IC block 112, the FPGA 110, and/or a combination thereof.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network device configured to receive a packet flow over a network from a source device, the network device comprising:
    an integrated circuit (IC) configured to accept a first range of bits corresponding to a header section of a packet in the packet flow, the IC including:
        a first barrel shifter configured to:
            receive a first shift amount from a field-programmable gate array (FPGA), the first shift amount indicating a first portion of the first range of bits extracted from the header section by the FPGA; and
            remove the first portion from the first range of bits to result in a second range of bits;
        a second barrel shifter configured to:
            receive, from the FPGA, an indication of a second shift amount indicating a second portion of the second range of bits extracted from the header section; and
            remove the second portion from the second range of bits to result in a third range of bits; and
    the FPGA configured with logic to cause the FPGA to:
        receive, from the IC, the first portion of the first range of bits;
        identify one or more first headers of the packet represented in the first portion of the first range of bits;
        store an indication of first header information corresponding to the one or more first headers of the packet represented in the first portion of the first range of bits;
        determine the first shift amount based at least in part on the one or more first headers;
        output the first shift amount to the first barrel shifter;
        receive, from the IC, the second portion of the second range of bits;
        identify one or more second headers of the packet represented in the second portion of the second range of bits;
        determine the second shift amount based at least in part on the one or more second headers; and
        output the second shift amount to the second barrel shifter.

2. The network device of claim 1, wherein:
    the second barrel shifter is configured to remove up to an upper range of bits from the second range of bits and down to a lower range of bits from the range of bits; and to determine the second shift amount is based at least in part on the second shift amount being within the upper range of bits and the lower range of bits.

3. The network device of claim 1, wherein:
the one or more first headers of the packet includes an ethernet header of the packet; and
the FPGA is configured with further logic to cause the FPGA to:
populate a lookup vector with data corresponding the ethernet header; and
store the lookup vector for subsequent processing.

4. The network device of claim 1, wherein:
the logic of the FPGA comprises a parse graph defining one or more header sequences recognizable by the network device; and
the parse graph is scheduled across at least the first barrel shifter and the second barrel shifter based at least in part on a size associated with the first portion and the second portion.

5. The network device of claim 1, wherein:
the logic of the FPGA comprises a parse graph defining one or more header sequences recognizable by the network device;
the FPGA is configured with further logic to cause the FPGA to:
identify one or more first layers in the parse graph associated with a header sequence defined by at least a portion of the one or more first headers of the packet; and
reset offsets for nodes in the parse graph that are subsequent the one or more first layers associated with the header sequence.

6. The network device of claim 5, wherein the FPGA is configured with further logic to cause the FPGA to:
identify one or more second layers in the parse graph associated with the header sequence defined by at least a portion of the one or more second headers of the packet; and
reset second offsets for second nodes in the parse graph that are subsequent the one or more second layers.

7. The network device of claim 6, wherein the one or more second headers of the packet includes at least one of:
an Internet Protocol version 4 (IPv4) header of the packet;
an IPv6 header of the packet;
a Transmission Control Protocol (TCP) header of the packet; or
a User Diagram Protocol (UDP) header of the packet.

8. A system comprising:
a network port configured to receive a packet flow over a network from a source device;
an integrated circuit (IC) configured to accept a first range of bits corresponding to a header section of a packet in the packet flow, the IC including:
a first barrel shifter configured to:
receive a first shift amount from a field-programmable gate array (FPGA), the first shift amount indicating a first portion of the first range of bits extracted from the header section by the FPGA; and
remove the first portion from the first range of bits to result in a second range of bits;
a second barrel shifter configured to:
receive, from the FPGA, an indication of a second shift amount indicating a second portion of the second range of bits extracted from the header section; and
remove the second portion from the second range of bits to result in a third range of bits; and
the FPGA configured with logic to cause the FPGA to:
receive, from the IC, the first portion of the first range of bits;
identify one or more first headers of the packet represented in the first portion of the first range of bits;
store an indication of first header information corresponding to the one or more first headers of the packet represented in the first portion of the first range of bits;
determine the first shift amount based at least in part on the one or more first headers;
output the first shift amount to the first barrel shifter;
receive, from the IC, the second portion of the second range of bits;
identify one or more second headers of the packet represented in the second portion of the second range of bits;
determine the second shift amount based at least in part on the one or more second headers; and
output the second shift amount to the second barrel shifter.

9. The system of claim 8, wherein:
the second barrel shifter is configured to remove up to an upper range of bits from the second range of bits and down to a lower range of bits from the second range of bits; and
to determine the second shift amount is based at least in part on the second shift amount being within the upper range of bits and the lower range of bits.

10. The system of claim 8, wherein:
the one or more first headers of the packet includes an ethernet header of the packet; and
the FPGA is configured with further logic to cause the FPGA to:
populate a lookup vector with data corresponding to at least the ethernet header; and
store the lookup vector for subsequent processing.

11. The system of claim 8, wherein:
the logic of the FPGA comprises a parse graph defining one or more header sequences recognizable by the network device; and
the parse graph is scheduled across at least the first barrel shifter and the second barrel shifter based at least in part on a size associated with the first portion and the second portion.

12. The system of claim 8, wherein:
the logic of the FPGA comprises a parse graph defining one or more header sequences recognizable by the system;
the FPGA is configured with further logic to cause the FPGA to:
identify one or more layers in the parse graph associated with a header sequence defined by at least a portion of the one or more first headers of the packet; and
reset offsets for nodes in the parse graph that are subsequent the one or more layers associated with the header sequence.

13. The system of claim 8, wherein the FPGA is configured with further logic to cause the FPGA to:
store a second indication of second header information corresponding to the one or more second headers of the packet.

14. The system of claim 13, wherein the one or more second headers of the packet includes at least one of:

an Internet Protocol version 4 (IPv4) header of the packet;
an IPv6 header of the packet;
a Transmission Control Protocol (TCP) header of the packet; or
a User Diagram Protocol (UDP) header of the packet.

15. A field-programmable gate array (FPGA) configured to analyze at least a packet of a packet flow over a network from a source device, the FPGA comprising:
an integrated circuit (IC) configured to accept a first range of bits corresponding to a header section of a packet in the packet flow, the IC including:
a first barrel shifter configured to:
receive a first shift amount from a field-programmable gate array (FPGA), the first shift amount indicating a first portion of the first range of bits extracted from the header section by the FPGA; and
remove the first portion from the first range of bits to result in a second range of bits;
a second barrel shifter configured to:
receive, from the FPGA, an indication of a second shift amount indicating a second portion of the second range of bits extracted from the header section; and
remove the second portion from the second range of bits to result in a third range of bits; and
the FPGA configured with logic to cause the FPGA to:
receive, from the IC, the first portion of the first range of bits;
identify one or more first headers of the packet represented in the first portion of the first range of bits;
store an indication of first header information corresponding to the one or more first headers of the packet represented in the first portion of the first range of bits;
determine the first shift amount based at least in part on the one or more first headers;
output the first shift amount to the first barrel shifter;
receive, from the IC, the second portion of the second range of bits;
identify one or more second headers of the packet represented in the second portion of the second range of bits;
determine the second shift amount based at least in part on the one or more second headers; and
output the second shift amount to the second barrel shifter.

16. The FPGA of claim 15, wherein:
the second barrel shifter is configured to remove up to an upper range of bits from the second range of bits and down to a lower range of bits from the second range of bits; and
to determine the second shift amount is based at least in part on the second shift amount being within the upper range of bits and the lower range of bits.

17. The FPGA of claim 15, wherein:
the one or more headers of the packet includes an ethernet header of the packet; and
the FPGA is configured with further logic to cause the FPGA to:
populate a lookup vector with data corresponding the ethernet header; and
store the lookup vector for subsequent processing.

18. The FPGA of claim 15, wherein:
the logic of the FPGA comprises a parse graph defining one or more header sequences recognizable by the network device;
the FPGA is configured with further logic to cause the FPGA to:
identify one or more first layers in the parse graph associated with a header sequence defined by at least a portion of the one or more first headers of the packet; and
reset offsets for nodes in the parse graph that are subsequent the one or more first layers associated with the header sequence.

19. The FPGA of claim 18, wherein the FPGA is configured with further logic to cause the FPGA to:
identify one or more second layers in the parse graph associated with the header sequence defined by at least a portion of the one or more second headers of the packet; and
reset second offsets for second nodes in the parse graph that are subsequent the one or more second layers.

20. The FPGA of claim 15, wherein the FPGA is configured with further logic to cause the FPGA to:
receive, from the second barrel shifter, the second portion of the range of bits;
identify one or more second headers of the packet represented in the second portion of the range of bits; and
store a second indication of second header information corresponding to the one or more second headers of the packet.

* * * * *